United States Patent

[11] 3,564,194

| [72] | Inventor | Charles C. Pease<br>Pennsauken, N.J. |
|---|---|---|
| [21] | Appl. No. | 751,333 |
| [22] | Filed | June 26, 1968 |
| [45] | Patented | Feb. 16, 1971 |
| [73] | Assignee | Omark Industries, Inc.<br>Portland, Oreg.<br>a corporation of Oregon<br>Continuation of application Ser. No.<br>427,206, Jan. 8, 1965, now abandoned. |

[54] TEMPERATURE-COMPENSATING STUD-WELDING POWER SUPPLY
4 Claims, 1 Drawing Fig.

[52] U.S. Cl..................................................... 219/108,
320/14, 320/21, 320/37
[51] Int. Cl........................................................ B23k 11/26
[50] Field of Search.............................................. 219/108,
110, 113, 14; 320/21, 37, 38, 39, 35, 36 (SCR);
307/297, 296, 298, 193

[56] References Cited
UNITED STATES PATENTS

| 2,070,541 | 2/1937 | Beetem ........................ | 320/21 |
|---|---|---|---|
| 3,056,016 | 9/1962 | Van Den Blink et al...... | 219/98 |
| 3,123,763 | 3/1964 | Kettler ......................... | 307/297 |
| 3,171,011 | 2/1965 | English......................... | 219/113 |
| 3,252,010 | 5/1966 | Buttenhoff.................... | 307/297 |
| 3,291,958 | 12/1966 | Glorioso....................... | 219/113 |
| 2,979,650 | 4/1961 | Godshalk et al............... | 320/35 |
| 3,062,998 | 11/1962 | Medlar.......................... | 320/35 |
| 3,300,704 | 1/1967 | McMillen...................... | 320/61 |

FOREIGN PATENTS

| 479,561 | 12/1951 | Canada ......................... | 320/36 |
|---|---|---|---|

*Primary Examiner*—J. V. Truhe
*Assistant Examiner*—J. G. Smith
*Attorney*—Charles F. Duffield ABSTRACT: A temperature-compensating circuit which employs a voltage divider across a battery to be charged which has a thermistor in one leg thereof and a capacitor across the opposite leg thereof. The capacitor, on reaching a predetermined charge, supplies a gating pulse through a unijunction transistor to a silicon controlled rectifier which operates a relay for discontinuing charging of the battery. A relay in the discharge circuit of the welding apparatus senses welding current and breaks the current flow through the silicon-controlled rectifier to deenergize the relay and reset the circuit for recharging of the battery following partial discharge thereof. A capacitor in parallel with the relay maintains the relay energized a predetermined time to prevent recharging of the battery until the welding cycle is completed.

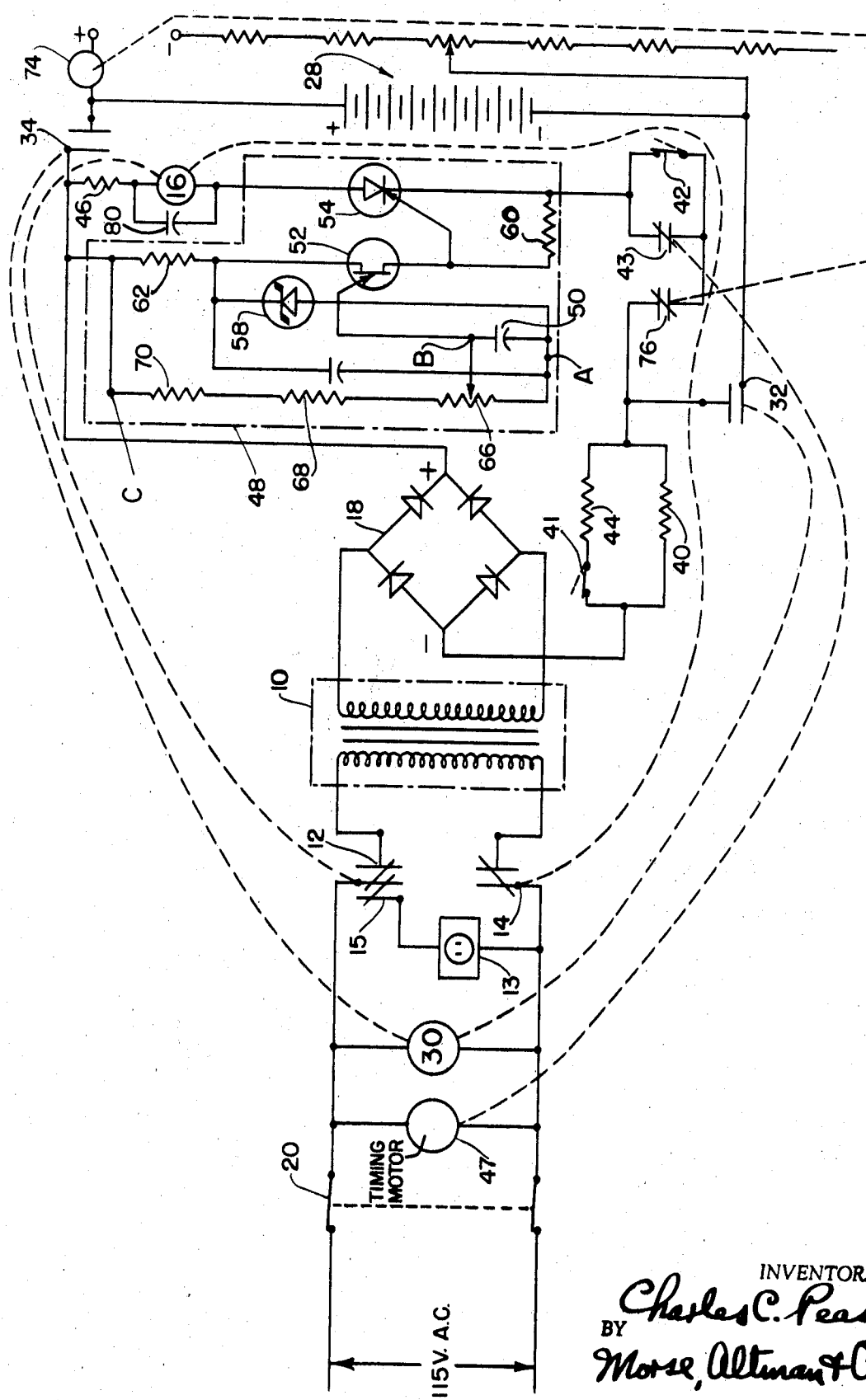

3,564,194

TEMPERATURE-COMPENSATING STUD-WELDING POWER SUPPLY

This invention relates to electric arc stud welding and more particularly to a novel and improved power supply for stud welding and is a continuation of application Ser. No. 427,206 filed Jan. 8, 1965.

SUMMARY AND OBJECTS OF INVENTION

In electric arc stud welding, the welding current is discharged across a gap between the stud and the work to which it is to be welded, to melt contiguous portions of the stud and work. The heat produced by the welding arc between the stud and work is, of course, dependent upon the potential, current and duration of the arc and for uniform, controlled and reproducible results, these factors should be precisely predetermined and remain constant throughout a sequence of welding operations. This object is achieved by supplying welding current from a power supply including storage means such as batteries or capacitors together with means for charging the storage means during the intervals between welding cycles.

During a sequence of welding cycles and periods therebetween, the condition of the power supply, particularly the temperature of the current storage means, is subject to substantial variation such that the heat energy output would vary during successive welding cycles and the current storage means may be damaged and its useful life impaired if compensation were not made for temperature changes. For example, the useful life of batteries may be impaired if they are charged to the same potential at elevated temperatures (e.g., 120° F.) as they are at ordinary temperatures (e.g., 75° F.).

Objects of the present invention are: to provide a novel and improved stud-welding power supply including current storage means and charging means for charging the storage means to a potential bearing a predetermined relationship to the ambient temperature of the storage means; to provide a power supply as described in which the charging means include a source of direct current and control means for starting and arresting the flow of charging current from the direct current source to the storage means; and to provide a power supply as described wherein the control means include temperature-responsive means for sensing the ambient temperature of the storage means and arresting the charging of the storage means when the charge thereon reaches a potential predeterminately related to the ambient temperature thereof.

Other objects of the invention are to provide in a stud-welding power supply of the type described: control means including relays for initiating and terminating the flow of charging current and solid state means for sensing the temperature of the storage means and controlling the operation of the relay means; control means permitting predetermined variation in the relationship between the temperature of the storage means and the potential to which it is charged; and a discharge circuit including the storage means and means for protecting the direct current source against damage by preventing initiation of charging of the storage means during discharge of welding current therefrom.

A further object of the invention is to provide a stud-welding power supply capable of delivering uniform welding current for repeated welding cycles over long periods, dependably and without damage or impairment of the welding supply.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing.

DESCRIPTION OF DRAWINGS

FIG. 1 is a schematic circuit diagram of an electrical circuit embodying the novel power supply of the invention.

DESCRIPTION OF INVENTION

The stud-welding power supply is designed for supplying welding current to stud-welding apparatus, such as a hand-operated gun, which holds the stud and positions and moves the stud relative to the work to which the stud is to be welded during a large number of welding cycles. During extended stud-welding operations, the period of welding current flow during each welding cycle is relatively short—usually a fraction of a second—as compared to the relatively long intervals (e.g., several seconds to several minutes) between welding cycles when the storage means from which welding current is drawn, has an opportunity to be recharged. The temperature of the storage means is, of course, dependent upon a number of factors including ambient temperature, air circulation, charging rate and particularly, the cycling rate of the power supply which is subject to variation over a wide range. The advantages of a solid-state temperature-voltage sensitive control in such a welding current supply are easily seen to include reliability and long operating life with a minimum effect on the ambient temperature of the remainder of the power supply while remaining substantially unaffected, except as desired, by the temperature of the other components.

Reference is now made to the circuit diagram of the stud-welding power supply of the invention. The power supply is designed to be operated from a standard alternating current (e.g., 115 volt) source and includes among its basic components, current storage means such as a battery or capacitor from which current is withdrawn for welding, means for controlling the operation of the power supply, particularly charging and discharging of the storage means, and means for supplying direct current for charging the storage means and operating the control means. The power supply is shown in an energized state, that is, in a condition in readiness for a welding cycle with the storage means fully charged. The direct current supply includes an isolation transformer 10 connected to a source of alternating current through normally closed points 12 and 14 of a control relay 16, for supplying current to a full wave bridge rectifier 18. A circuit breaker or switch 20 is provided between the alternating current source and the other components of the power supply for rendering the entire power supply inoperative.

The current storage means are shown as batteries 28 connected to one output terminal of rectifier 18 through normally open points 32 of a double-pole double-throw discharge control relay 30 and to the other output terminal through normally open points 34 of relay 30. Discharge control relay 30 is connected across the alternating current input and remains energized keeping points 32 and 34 closed as long as circuit breaker 20 is closed and the power supply is operative. When discharge control relay 30 is deenergized, points 32 and 34 open preventing slow discharge of batteries 28 through the coil of relay 16. A resistor 40 and contacts 41 of a switch and resistor 44 connected in parallel with resistor 40 are connected between the rectifier and points 32 for limiting the charge rate of batteries 28, with switch 41 providing means for selecting one of two values for the charging resistance and charging current. Charging of batteries 28 is initiated by closing relay points 12 and 14 causing a direct current potential to appear at the output terminals of rectifier 18 which in turn, charges the batteries through resistors 40 and 44 and points 32 and 34 of discharge control relay 30. Charging of batteries 28 is terminated by energizing control relay 16 opening points 12 and 14.

The power supply includes a circuit comprising solid-state components combined to function as a temperature-voltage sensitive relay for controlling the energization of control relay 16. This circuit constituting a solid-state temperature-voltage relay is generally designated 48 and is designed to energize control relay 16 to terminate the charging of the batteries when the charge thereon reaches a potential predeterminately related to the ambient temperature of the batteries. In the circuit shown by way of example, the batteries are charged to a potential inversely proportional to temperature and the solid-state temperature-voltage relay 48 comprises a capacitor 50, unijunction transistor 52 and silicon-controlled rectifier 54 connected in combination to form a relaxation oscillator-type of circuit. Silicon-controlled rectifier 54 and control relay 16 are connected in series with a current-limiting resistor 46 to the output terminals of rectifier 18. The two bases of unijunction transistor 52 are connected in parallel with the silicon-controlled rectifier and with a Zener diode 58 which, together with resistors 60 and 62 connected in series with the bases, applied a constant predetermined bias across the two bases of the unijunction transistor. Capacitor 50 is connected to the emitter of the unijunction transistor so as to cause the transistor to conduct from emitter to base, when the potential of the charge on the capacitor reaches a value known as the peak point voltage of the unijunction, allowing the capacitor to discharge through the unijunction to produce a pulse across resistor 60. The base of the unijunction (to which resistor 60 is connected) is coupled directly with the gate of silicon-controlled rectifier 54 thereby applying the pulse to the silicon-controlled rectifier rendering it conductive and energizing control relay 16.

The charging control circuit described includes capacitor 50 that is charged to the peak point voltage of unijunction transistor 52 causing it to conduct and supply a gating pulse to silicon-controlled rectifier 54 to render the latter conductive, energizing control relay 16 opening points 12 and 14 disrupting the charging current. Capacitor 50 is charged through a voltage divider network comprising a variable resistor 66, a resistor 68 and a thermistor 70 connected directly across the battery terminals. Variable resistor 66 is adjusted so that the potential on capacitor 50 will reach the peak point voltage of the unijunction transistor at the same time the charge on the batteries reaches the desired potential, discontinuing the charging of the batteries at this point in the manner described. It will be apparent from the circuit diagram that the ratio of the peak point voltage to the total battery potential is equal to the ratio of the resistance between points designated A and B and the resistance between points A and C in the diagram voltage divider network. Thermistor 70 is located within the apparatus in a position to sense the ambient temperature of the batteries, and its resistance will vary inversely as its temperature thereby varying the ratio of the resistance between points A and B to the resistance between points A and C. Thus, when the temperature of the batteries and thermistor increases, the resistance of the thermistor will decrease resulting in an increase in the ratio of the resistance between points A and B to the resistance between points A and C which in turn results in an increase in the ratio of peak point voltage to total battery potential. Since the peak point voltage of the unijunction transistor is constant, the battery potential must be lower at the time the transistor conducts, supplying a gating pulse to the silicon-controlled rectifier. It is in this manner that the potential to which the batteries are charged is made an accurately predetermined inverse function of temperature.

It should also be apparent that by a proper selection and location of resistors and the thermistor in the voltage divider network, it will be equally feasible to make battery potential equal to any predetermined direct function of temperature. This could be accomplished, for example, by locating the thermistor between points A and B of the divider network so that the proportion of resistance between A and B to resistance between A and C is decreased rather than increased due to an increase in the temperature of the thermistor.

Silicon-controlled rectifier 54 remains conductive until the flow of current therethrough is interrupted or is reduced below a predetermined minimum, causing it to return to its forward blocking state. Charging of the batteries cannot be recommenced until the silicon-controlled rectifier is turned off deenergizing control relay 16 and allowing points 12 and 14 to close. In order to provide for recharging of the batteries following each welding operation, the power supply also comprises a discharge circuit including a magnetic relay 74 connected in series between one of the battery terminals and the welding current output terminals of the power supply. Relay 74 includes normally closed points 76 connected in series with rectifier 18, control relay 16 and silicon-controlled rectifier 54, for interrupting the flow of current through the silicon-controlled rectifier and control relay when the batteries are discharged through relay 74 during welding. In order to prevent closing of points 12 and 14 during welding which would result in short circuiting the output of rectifier 18 through the stud and workpiece and possible damage to the rectifier, a capacitor 80 is connected across control relay 16 for keeping the control relay energized for a short interval after points 76 are opened. The time constant of capacitor 80 and control relay 16 is selected to provide a period, e.g., of 2 seconds duration, which is sufficient to permit completion of the longest stud-welding cycle before control relay 16 is deenergized allowing points 12 and 14 to close.

The power supply is designed for so-called "standby" operation during which welding does not occur and the batteries are maintained in a fully charged condition in readiness for welding. For this purpose, the switch including contacts 41 includes another set of normally closed contacts 42 connected between contacts 76 and silicon-controlled rectifier 54 and adapted to be opened for interrupting the flow of current through the silicon-controlled rectifier and control relay 16 permitting charging of the batteries. Contacts 41 are opened simultaneously with contacts 42 and resistors 40 and 44 have values such that the charging current is reduced during standby operation. A switch 43 is connected in parallel with contacts 42 between switch 76 and silicon-controlled rectifier. Switch 43 is operated by a cam driven by a timing motor 47 connected across the AC power supply. Motor 47 provides for recharging of the batteries at regular intervals when the power supply is on standby operation and rotates the cam-controlling switch 43 through one revolution in a predetermined period, e.g., 5 minutes, and the cam has a dwell period, e.g., 10—15 seconds, during which switch 43 is opened deenergizing control relay 16 allowing charge current to flow.

The welding apparatus with which the power supply is employed includes electrically operated controls powered from an outlet 13 connected to the AC source through normally open contacts 15 of control relay 16. This arrangement prevents the operator from performing a welding cycle when the batteries are not fully charged and further insures uniform, reproducible results.

Since certain changes may be made in the above apparatus without departing from the scope of the invention herein involved, it is intended that all matter contained in the above description or shown in the accompanying drawing shall be interpreted as illustrative and not in a limiting sense.

I claim:

1. A temperature-compensating charging circuit for a stud-welding power supply comprising:
   energy storage means;
   a source of charging current;
   circuit interrupter means including normally closed electrical contacts in circuit between said source of charging current and said energy storage means and including a relay coil for opening said contacts to interrupt charging of said energy storage means upon energization of the relay coil;
   control means having anode and cathode terminals in series with said relay coil and a control electrode for rendering said control means conductive to energize said relay coil upon the presence of a control signal at said control electrode;
   voltage divider means including temperature responsive means connected across said energy storage means and responsive to the voltage and temperature of said energy storage means for supplying an output signal which varies in proportion to the voltage on the said energy storage means and inversely to the temperature of said energy storage means;

a capacitor connected across said divider means and charged by said output signal of said divider means; and semiconductor means connected between said capacitor and the control electrode of said control means for passing a control signal to said control means upon the capacitor reaching a predetermined voltage level whereupon the control means will energize the relay coil of said circuit interrupter means and open said electrical contacts to discontinue charging of said energy storage means.

2. The temperature-compensating charging circuit of claim 1 wherein the control means is a silicon-controlled rectifier and the semiconductor means is a unijunction transistor having its emitter connected to the capacitor and one of its bases in circuit with the control electrode of the silicon-controlled rectifier to provide the control signal thereto.

3. The temperature-compensating charging circuit of claim 1 wherein the temperature-responsive means comprises a thermistor; and said voltage divider means has two legs in which said thermistor is disposed in one leg and said capacitor is disposed across the opposite leg.

4. The temperature-compensating charging circuit of claim 1 further including means for cyclically deenergizing said relay coil to periodically recharge said energy storage means during standby use.